United States Patent
Miura

(10) Patent No.: US 6,736,726 B1
(45) Date of Patent: May 18, 2004

(54) INFORMATION DISTRIBUTION SYSTEM AND PROGRAM

(75) Inventor: Katsuhiro Miura, Ota-Ku (JP)

(73) Assignee: Namco Limited, Tokyo (JP)

( * ) Notice: Subject to any disclaimer, the term of this patent is extended or adjusted under 35 U.S.C. 154(b) by 131 days.

(21) Appl. No.: 09/890,341

(22) PCT Filed: Nov. 29, 2000

(86) PCT No.: PCT/JP00/08382

§ 371 (c)(1),
(2), (4) Date: Aug. 23, 2001

(30) Foreign Application Priority Data

Dec. 2, 1999 (JP) .......................................... 11-342959

(51) Int. Cl.[7] ................................................ A63F 13/12
(52) U.S. Cl. ........................ 463/41; 455/3.04; 455/3.05; 709/219
(58) Field of Search ..................... 463/40–42; 455/3.04, 455/3.05, 414.3; 709/217–219

(56) References Cited

U.S. PATENT DOCUMENTS 5,999,526 A * 12/1999 Garland et al. ............. 709/219

FOREIGN PATENT DOCUMENTS

| JP | A 3-179847 | 8/1991 |
|----|------------|--------|
| JP | A 4-158460 | 6/1992 |
| JP | A 4-168861 | 6/1992 |
| JP | A 8-172437 | 7/1996 |
| JP | A 8-191954 | 7/1996 |
| JP | A 10-171705 | 6/1998 |
| JP | B2 2788939 | 6/1998 |
| JP | A 10-198611 | 7/1998 |
| JP | A 10-271562 | 10/1998 |
| JP | A 10-286381 | 10/1998 |
| JP | A 11-57215 | 3/1999 |
| JP | A 11-85647 | 3/1999 |
| JP | A 11-168581 | 6/1999 |
| JP | A 11-244536 | 9/1999 |
| JP | A 11-267355 | 10/1999 |

OTHER PUBLICATIONS

Michelle Dielo, "Nippon no Dansei ga hamaru "I–mode" no Giji renai Game", [online], Nov. 28, 2000, Kabushiki Kaisha NTT–X, et al.

"News Release", [online], Nov. 22, 1999, NTT Tokai Ido Tsushinmou K.K.

* cited by examiner

Primary Examiner—Andrew M. Dolinar
(74) Attorney, Agent, or Firm—Oliff & Berridge, PLC

(57) ABSTRACT

To provide an information distribution device and program that make it possible to reduce a user's waiting time, the system is provided with general data (122) that contains access frequencies of a plurality of portable telephones (200) and an image generation section (113) that generates an image specifying a distribution request time for each portable telephone (200), and distribution request time specifying information that specifies a vacant time period as a distribution request time is transmitted to the portable telephone (200).

22 Claims, 9 Drawing Sheets

FIG. 5

Table 121:

| USER ID | NAME | ADDRESS | AGE | OCCUPATION | NUMBER OF PLAYS | DEGREE OF PROGRESS | SCORE | SPECIFIED TIME-POINT | SPECIFIED TYPE |
|---|---|---|---|---|---|---|---|---|---|
| 13524867 | HARUTA | TOKYO | 20 | STUDENT | 153 | ENGAGED | 1430 | 13:00 | APPROXI-MATE TIME |

123

Table 124:

| ACCESS TIME ZONE | NUMBER OF ACCESSES |
|---|---|
| 0:00 TO 1:00 | 7 |
| 1:00 TO 2:00 | 1 |
| ... | ... |
| 21:00 TO 22:00 | 23 |
| 22:00 TO 23:00 | 87 |
| 23:00 TO 24:00 | 32 |

FIG. 6

Table 122:

| NUMBER | SERVICE DETAILS | REQUEST TIME-POINT | RESPONSE TIME-POINT |
|---|---|---|---|
| 1 | SERVICE A | 12:30:00, SEPTEMBER 16, 1999 | 12:31:00, SEPTEMBER 16, 1999 |
| 2 | SERVICE B | 12:55:00, SEPTEMBER 16, 1999 | 12:56:30, SEPTEMBER 16, 1999 |
| ... | ... | ... | ... |
| 210 | SERVICE A | 18:22:10, SEPTEMBER 16, 1999 | 18:24:40, SEPTEMBER 16, 1999 |
| 211 | SERVICE B | 18:22:30, SEPTEMBER 16, 1999 | 18:25:30, SEPTEMBER 16, 1999 |

126

| ACCESS TIME ZONE | NUMBER OF ACCESSES |
|---|---|
| 0:00 TO 1:00 | 4 |
| 1:00 TO 2:00 | 1 |
| ... | ... |
| 22:00 TO 23:00 | 0 |
| 23:00 TO 24:00 | 0 |

127

| SPECIFIED TIME | NUMBER OF SPECIFICATIONS |
|---|---|
| 0:00 | 1 |
| 1:00 | 4 |
| ... | ... |
| 22:00 | 5 |
| 23:00 | 5 |

| TERMINAL NUMBER | DEADLINE TIME-POINT |
|---|---|
| 1 TO 99 | 18:00, SEPTEMBER 30 |
| 100 TO 199 | 19:00, SEPTEMBER 30 |
| 200 TO 299 | 20:00, SEPTEMBER 30 |
| ⋮ | ⋮ |

129

INFORMATION DISTRIBUTION SYSTEM AND PROGRAM

TECHNICAL FIELD

The present invention relates to an information distribution system and a program, and, in particular, to an information distribution system and program that enables a game on that terminal by creating and distributing game information based on a request from the terminal.

BACKGROUND OF ART

Game systems that display a game image on the screen of a portable telephone have been implemented, to enable the playing of games thereon.

In such a game system, game information such as page data for game images is distributed to the portable telephone from a predetermined information distribution system, and the game is played by the updating of pages.

If a large number of people should access the information distribution system simultaneously, however, the processing capability of the information distribution device may be exceeded. That could cause an increase in the response waiting time and make the game fail to progress partway through.

When customers want to apply for prizes or acquire concert tickets, they apply just before the deadline and thus accesses to the server tend to cluster immediately after the start of acceptance if applications are dealt with in first-come-first-served order.

Within a certain period, there are times at which accesses cluster and other times at which there are few accesses. Even within a single day, there are time periods in which accesses cluster and time periods in which there are few accesses.

In such a case, a prior-art information distribution device would cope by providing information to the user by transmitting a message such as "We are busy at the moment" when there is a cluster of accesses, to reinforce the processing capability of the information distribution system and the communications line. Transmitting the above message to the terminal device does not, however, remove the user's dissatisfaction and, if it does reinforce the processing capability, it does so at great cost.

DISCLOSURE OF THE INVENTION

The present invention was devised in the light of the above described problem and has as an objective thereof the provision of an information distribution system and program that make it possible to disperse accesses from terminal devices. Another objective of the present invention is to provide an information distribution system and program that make it possible to reduce the waiting time of access from a terminal device.

(1) In order to solve the above described problem, an information distribution system in accordance with the present invention relates to an information distribution system distributing predetermined information to a terminal device over a transfer path, the information distribution system comprising:

information generation means which generates distribution request time specifying information that specifies a distribution request time indicating a time-point or a time period at which the terminal device issues a distribution request for the predetermined information; and means for transmitting generated distribution request time specifying information to the terminal device.

wherein the information generation means specifies the distribution request time so as to disperse a distribution request time for the terminal device.

(2) A program in accordance with the present invention relates to a program embodied on an information storage medium or in a carrier wave which is a program for distributing predetermined information to a terminal device over a transfer path, the program comprising means for implementing in a computer:

information generation means which generates distribution request time specifying information that specifies a distribution request time indicating a time-point or a time period at which the terminal device issues a distribution request for the predetermined information; and means for transmitting generated distribution request time specifying information to the terminal device, wherein the information generation means specifies the distribution request time so as to disperse a distribution request time for the terminal device.

The present invention makes it possible to stagger distribution requests by having the information distribution system side specify a distribution request time for the terminal device. Since this ensures that accesses do not cluster, it reduces irritations such as processing wait time, enabling congenial distribution processing. This also reduces the time that the user of the terminal device has to wait, making it possible for the user to receive the requested service smoothly.

The method used to specify a distribution request time in such a manner that the distribution request times of the terminal devices are staggered could be one in which the specification of each distribution request time is based on history data which is stored in a predetermined storage area and which indicates the history of at least one of distribution requests and responses corresponding to the distribution requests, one in which the specification of each distribution request time is based on actual distribution requests.

(3) In this information distribution system or program, it is desirable that the information generation means specifies the distribution request time, based on history data which is stored in a predetermined storage area and which indicates a history of at least one of a distribution request and a response corresponding to the distribution request.

This makes it possible to ensure that distribution requests from terminal devices do not cluster, by specifying a time-point or time period at which there are few requests or responses as the distribution request time, by way of example, with reference to the history of requests or responses in the past Note that the history data in this case corresponds to data comprising a history of service request time-points and service provision time-point, byway of example. This clarifies the service processing time for each time period, making it possible to give the user a smooth service by determining the time periods in which distribution requests tend to cluster and specifying a distribution request time in a time period in which distribution requests do not cluster.

(4) This information distribution system desirably comprises:

means which receives distribution request information from the terminal device; and control means which updates the history data, based on the distribution request information and a response corresponding to the distribution request.

(5) This program desirably makes a computer implement:
means for a reception means to receive distribution request information from the terminal device; and
control means which updates the history data, based on the distribution request information and a response corresponding to the distribution request.

This makes it possible to maintain the history data in an up-to-date manner, so that the user can always receive a congenial service.

(6) In this information distribution system or program, it is desirable that the information generation means generates information specifying at least one of a start time-point of accepting the distribution request and an end time-point of the distribution request as part of the distribution request time specifying information.

In general, distribution requests cluster immediately after the acceptance-start time-point or immediately before the acceptance-end time-point. More specifically, distribution request cluster at times such as at the start of reservation of concert tickets or at the deadline of a prize application period, but this configuration makes it possible to prevent any cluster of excessive distribution requests so that users can receive information in a congenial manner, by specifying an acceptance-start time-point or acceptance-end time-point for distribution requests.

(7) In this information distribution system or program, it is desirable that the storage area stores request frequency data, which indicates a frequency of the distribution requests from a plurality of terminal devices for each of predetermined time periods, and
the information generation means specifies as the distribution request time a time period in which the distribution request frequency is low, or a time-point included in the time period, based on the request frequency data.

By specifying a time period in which the distribution request frequency is low, with reference to the distribution request frequency, it becomes possible to promptly process any distribution request that occurs in that time period, enabling the user to receive a congenial service.

In this case, the method of specifying a time period in which the distribution request frequency is low, or a time-point belonging to such a time period, is preferably a method of specifying a time period in which the frequency is low or the probability of access is low, based on a frequency distribution or probability distribution of distribution requests in different time periods.

(8) In this information distribution system or program, it is desirable that the storage area stores personal request frequency data, which indicates frequency of a distribution request from the terminal device and which is provided for each user of the terminal device, and
the information generation means specifies as the distribution request time a time period in which the distribution request frequency is low, or a time-point included in the time period, based on the personal request frequency data.

This makes it possible to stagger the distribution request times for different users. This also makes it possible to stagger all of the distribution request times and enable the distribution of congenial information.

(9) In this information distribution system or program, it is desirable that the storage area stores user data which is provided for each user of the terminal device and comprises at least one of a name, address, date of birth, age, occupation, telephone number, and game play history information of the each user, and the control means identifies a user from the distribution request information and updates the user data for the identified user.

This provision of user data makes it possible to base the staggering of distribution request times on a factor such as address or occupation. If times are staggered by age, by way of example, it is possible to specify distribution request times in such a manner that teenagers are given times between 17:00 and 21:00, people in their twenties are given times between 23:00 and 01:00, and people in their thirties are given times between 21:00 and 23:00.

(10) In this information distribution system or program, it is desirable that the user data comprises address information indicating the address of the each user, and
the information generation means generates distribution request time specifying information which specifies distribution request times that differ for different regions, based on the address information.

This makes it possible to ensure that the same distribution request time is given within the same region, so that the user is unlikely to notice that different distribution request times have been specified, leaving the user with no feeling of unfairness.

(11) In this information distribution system or program, it is desirable that the user data comprises the distribution request time specifying information that was specified with respect to the each user, and
the control means updates the user data, based on distribution request time specifying information specified by the information generation means.

This makes it possible to easily determine whether or not a request has come in within the specified time period, when there is a distribution request from a user in practice, by previously storing distribution request time specifying information in the user data.

(12) In this information distribution system or program, it is desirable that the storage area stores distribution request specifying data indicating number of time-point or time period specified as the distribution request time, and
the control means updates the distribution request specifying data, based on the distribution request time specifying information specified by the information generation means.

This makes it possible to maintain data on the specified distribution request time and the number of specifications so that it is always up to date. This also makes it possible to prevent specifications clustering at a specific distribution request time, by specifying distribution request time with reference to the distribution request specifying data.

(13) In addition, with the information distribution system or the program, information that is distributed to the terminal device is game information, and
the information generation means generates game information for playing at least one of a game image and a game sound on the terminal device.

This makes it possible to distribute game information to the terminal device and also specify a distribution request time-point for the game. In particular, if distribution requests for real-time processing, such as that for a game. cluster within a specific time period, a situation may arise in which the processing capability of the distribution device is exceeded and the player is unable to enjoy a real-time game. By staggering the distribution request times, it becomes possible to reduce problems such as processing wait times at the distribution device side and thus enable the player to enjoy a real-time game.

(14) In this information distribution system or program, it is desirable that the control means updates the user data, based on a time-point of the distribution request, and the information generation means generates at least one of
game information which makes a game progress more
advantageously when the terminal device has issued a
distribution request at a time-point conforming with the
distribution request time than when a distribution
request has been issued at a time-point not conforming
with the distribution request time, and game information which makes a game progress less advantageously
when the terminal device has issued a distribution
request at a time-point not conforming with the distribution request time than when a distribution request has
been issued at a time-point conforming with the distribution request time, based on the user data.

The player can be given incentive to issue distribution requests at the distribution request time specified for the terminal device, by receiving processing that is advantageous to the game if the distribution request occurs at a time-point that conforms with the distribution request time. This makes it possible to increase the number of players who issue distribution requests at the distribution request times, reducing the processing wait time and enabling the players to enjoy a real-time game.

(15) In this information distribution system or program, it is desirable that the control means updates the personal request frequency data, based on a time-point of the distribution request, and the information generation means generates at least one of
game information which makes a game progress more
advantageously when the terminal device has issued
distribution requests dispersedly over a plurality of
time periods than when distribution requests have been
issued concentratedly, and game information which
makes a game progress less advantageously when the
terminal device has issued distribution requests concentratedly within a predetermined time period than
when distribution requests have been issued
dispersedly, based on the personal request frequency
data.

This makes it possible to give the player incentive to issue distribution requests that are dispersed over a plurality of time periods, not clustered within a specific time period, by providing processing that is advantageous to the game if the terminal device issues distribution request that are dispersed over a plurality of time periods. It is therefore possible to increase the number of players who issue dispersed distribution requests, thus reducing the processing wait time and enabling the players to enjoy a real-time game.

(16) An information distribution system in accordance with
the present invention relates to an information distribution
system distributing predetermined information to a terminal device over a transfer path, the information distribution system comprising:

means for receiving from the terminal device distribution
request time specifying information comprising a
specification of a distribution request time indicating a
time-point or time period at which the terminal device
issues a distribution request for the predetermined
information;

information generation means for generating distribution
request time allowing/refusing information that is
stored in a predetermined storage area and indicates
allowance or refusal to a specification of a distribution
request time, based on history data, which indicates a
history of at least one of a distribution request and a
response corresponding to the distribution request, and
on the distribution request time specifying information;
and means for transmitting the generated distribution request
time allowing/refusing information to the terminal
device

(17) A program in accordance with the present invention
relates to a program embodied on an information storage
medium or in a carrier wave which is a program for
distributing predetermined information to a terminal
device over a transfer path, the program comprising
means for implementing in a computer:

means for a reception means to receive from the terminal
device distribution request time specifying information
comprising a specification of a distribution request time
indicating a time-point or time period at which the
terminal device issues a distribution request for the
predetermined information;

information generation means for generating distribution
request time allowing/refusing information that is
stored in a predetermined storage area and indicates
allowance or refusal to a specification of a distribution
request time, based on history data, which indicates a
history of at least one of a distribution request and a
response corresponding to the distribution request, and
on the distribution request time specifying information;
and means for a transmission means to transmit the generated
distribution request time allowing/refusing information
to the terminal device.

The present invention makes it possible for the user of the terminal device to determine when would be a good time to issue a distribution request, by hinting at a permitted distribution request time in accordance with a request from the terminal. If the user is thereby induced to issue distribution requests in a time period or at a time-point that is suitable for distribution requests, access waiting time can be reduced and congenial information can be distributed.

Note that the predetermined information in this case is preferably at least one of game image information and game sound information.

(18) In this information distribution system or program, it is
desirable that the terminal device is a portable terminal
device comprising:

means for inputting operating information of a user;

means for transmitting distribution request information
including the operating information and receiving the is
predetermined information; and display means for displaying an image based on received
predetermined information.

This makes it possible to reduce the processing wait time and provide a congenial service, when the terminal device that is used has very little storage area and thus must issue distribution requests frequently to download data substantially every time it is required, such as a portable terminal device.

Note that the portable terminal device in this case could be a portable information terminal, a portable telephone set, a portable game device, or a portable type of personal computer (PC).

(19) In this information distribution system or program, it is
desirable that the portable terminal device is a portable
telephone set, and the display means comprises:
a display formed integrally with the telephone set; and
means for shaping and displaying the image on the
display.

This makes it possible to display a wide range of images by means such as a browser for shaping game images for display, thus making it possible for the user to receive a wide range of services in real time. Note that this enables the player to use a browser in a portable telephone set to access a service that provides information that can be displayed, such as NTT's i-mode service.

Note also that the portable telephone-set in this case could be a portable telephone, a personal handyphone system (PHS) unit, or a portable telephone that employs satellite communications.

BRIEF DESCRIPTION OF THE DRAWINGS

FIG. 5 is a schematic view of individual data in accordance with an example of this embodiment of the present invention.

FIG. 6 is a schematic view of general data in accordance with an example of this embodiment of the present invention.

FIG. 8 is a schematic view of a deadline time-point table in accordance with an example of this embodiment of the present invention.

BEST MODE FOR CARRYING OUT THE INVENTION

Examples of the invention applied to a game system that uses a portable telephone are described below with reference to the accompanying figures.

Figure 1:
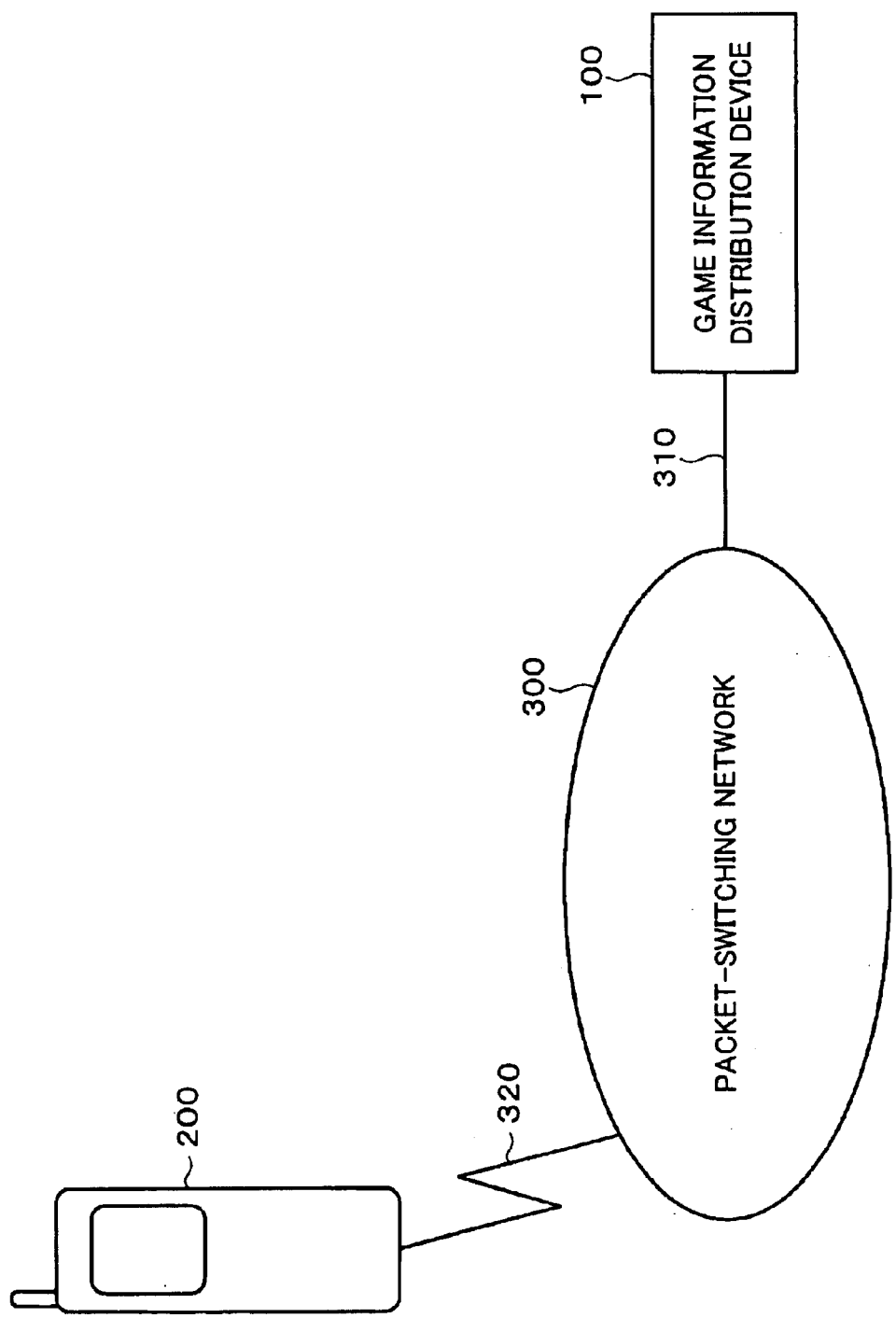
FIG. 1 is a schematic view of a game system in accordance with an example of this embodiment of the present invention.

A schematic view of the game system in accordance with an example of this embodiment of the invention is shown in FIG. 1.

The game system comprises a portable telephone 200, which functions as a terminal device, and a game information distribution device 100, which functions as an information distribution device that generates game information based on distribution request information that is transmitted from the portable telephone 200 over a transfer path and transmits game information to the portable telephone 200.

In this case, the game information distribution device 100 and the portable telephone 200 are connected together by a packet-switching network 300. The transfer paths between the game information distribution device 100 and the portable telephone 200 include a wireless transfer path 320 and a wired transfer path 310.

Note that data is transferred between the game information distribution device 100 and the portable telephone 200 in packet format within the packet-switching network 300, via a base station and a packet assembler/disassembler or the like. In practice, a plurality of these portable telephones 200 will be connected to the game information distribution device 100 by the packet-switching network 300.

First of all, a player uses the portable telephone 200 to connect to the packet-switching network 300 and the portable telephone 200 transmits distribution request data to the game information distribution device 100, based on the player's actions. Game information is generated by the game information distribution device 100 in accordance with the distribution request, then is transmitted by a transmission means to the portable telephone 200.

The portable telephone 200 receives the game information from the game information distribution device 100, then displays game images on a screen of the portable telephone 200 to implement a game.

Figure 2:
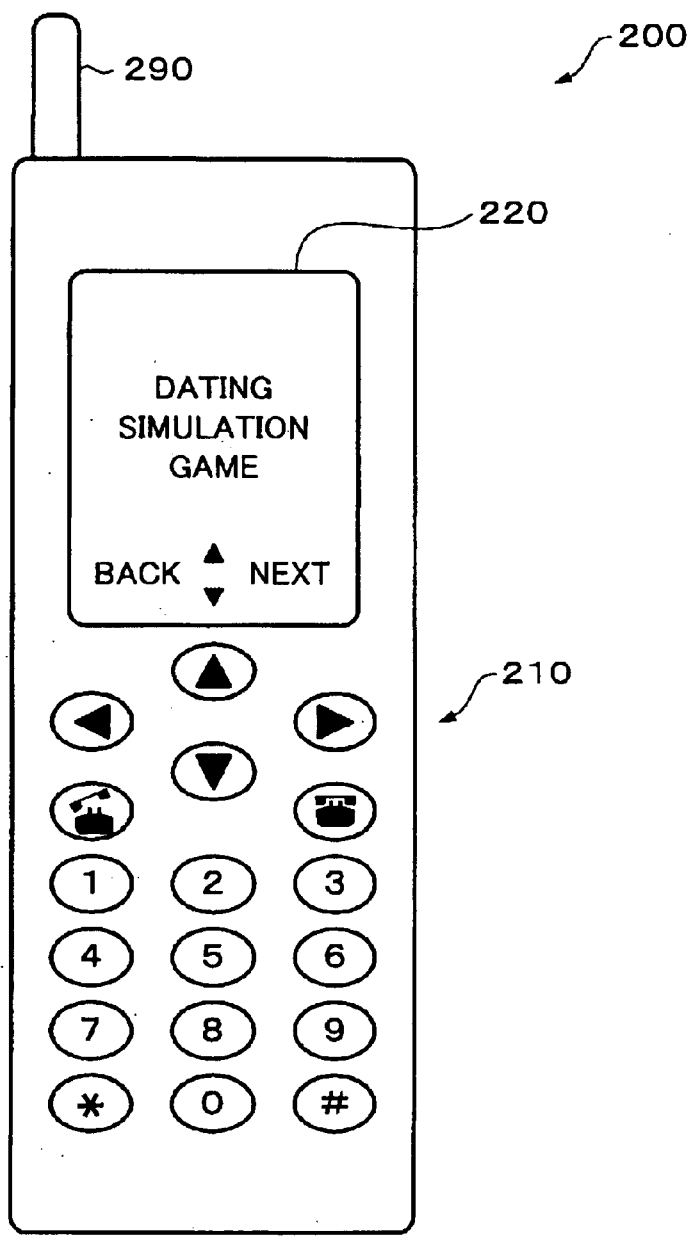
FIG. 2 is an external view of a portable telephone.

An external view of the portable telephone 200 is shown in FIG. 2.

The portable telephone 200 comprises a plurality of keys that function as an operating section 210, a display section 220 on which characters and images are displayed, and an antenna that functions as a transmission/reception section 290. In this case, the display section 220 comprises a liquid-crystal screen that is a display formed integrally with the portable telephone 200.

The player plays a game by pressing keys to update the image display on the liquid-crystal screen.

The description below is based on a dating simulation game, as an example of implementation.

Figure 3:
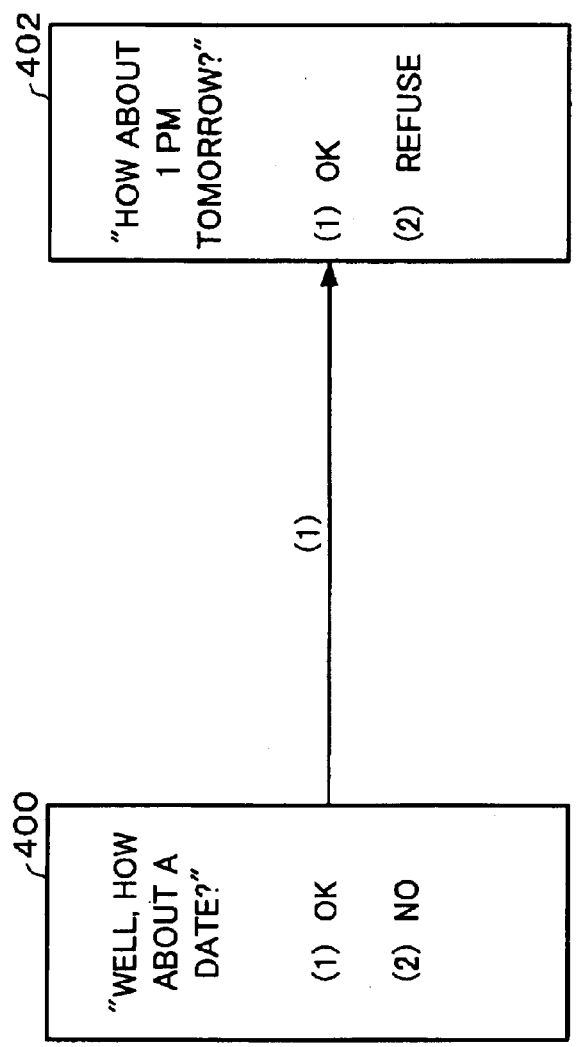
FIG. 3 shows an example of an game image transition in accordance with an example of this embodiment of the present invention.

An example of a game image transition in accordance with this embodiment of the present invention is shown in FIG. 3.

Assume that an image 400 that poses the question: "Well, how about a date?" is displayed on the display section 220 in one scene of the game and the player presses the numeric key 1 to select "(1) Make a date".

The fact that the player has selected "(1) Make a date" is transferred to the game information distribution device 100 as part of the distribution request information, and the game information distribution device 100 generates information for displaying an image 402 that shows the reply "How about 1 PM tomorrow?" as the date and time that the player should access the game information distribution device 100 next.

If the player presses the numeric key 1 of the portable telephone 200 when the image 402 is displayed, to select "(1) OK", the player confirms the date and time to access the game information distribution device 100 next.

With this embodiment of the present invention, the game information distribution device 100 that distributes game information can thus specify a distribution request date/time for the portable telephone 200. This makes it possible to control the times at which portable telephones 200 access the game information distribution device 100, in situations such as those in which there are accesses from a plurality of portable telephones 200. It is therefore possible to prevent a situation in which accesses to the game information distribution device 100 cluster within a predetermined time period, making processing impossible. This enables each player to receive the game service of the game information distribution device 100 in a congenial manner, without experiencing irritations such as having to wait for the processing of the game information distribution device 100.

The description now turns to the functional blocks that implement this game information distribution device 100.

Figure 4:
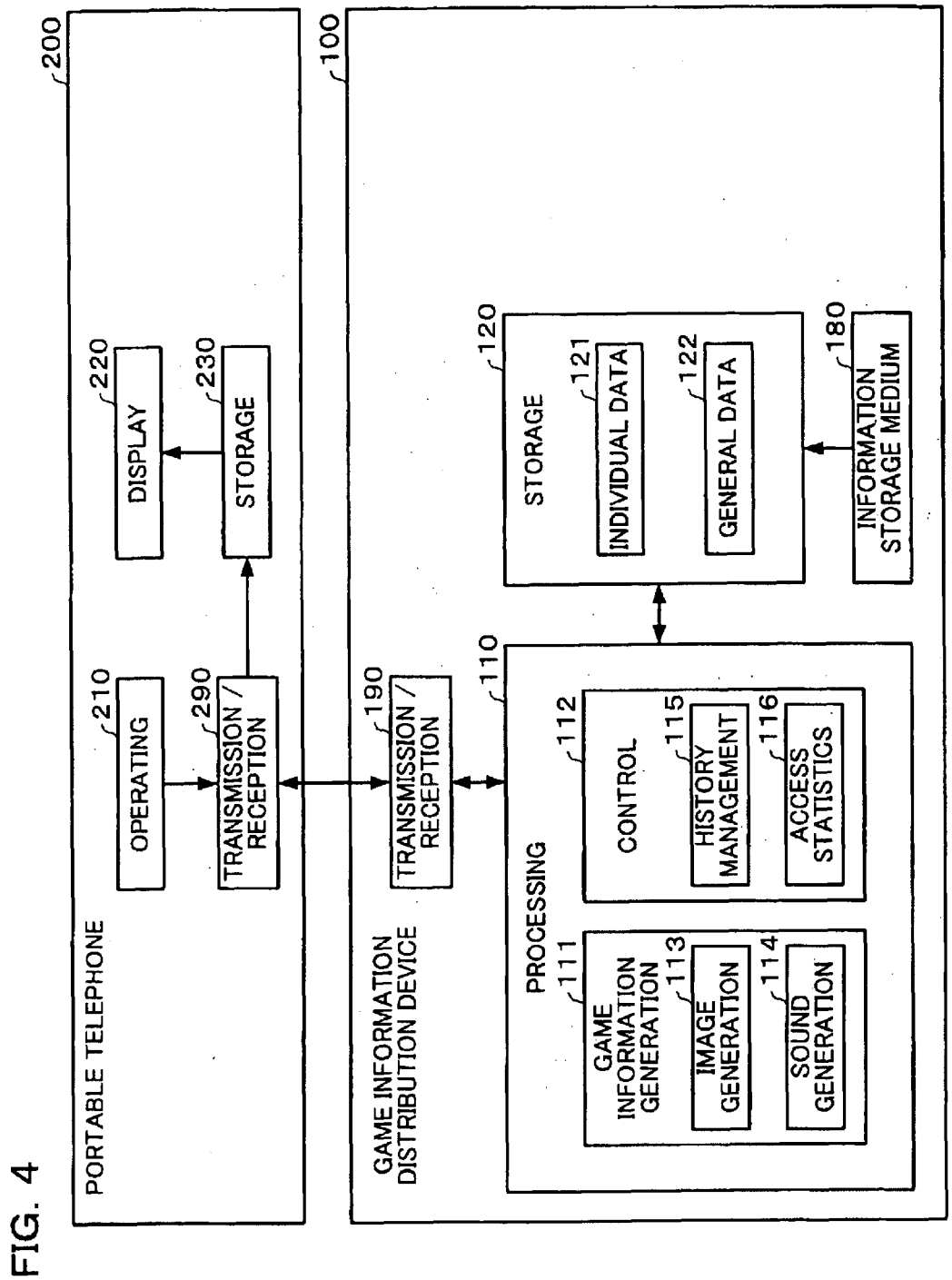
FIG. 4 is a functional block diagram of a game information distribution device in accordance with an example of this embodiment of the present invention.

A functional block diagram of the game information distribution device 100 in accordance with this example of the present invention is shown in FIG. 4.

The portable telephone 200 that sends a distribution request to the game information distribution device 100 comprises the previously described operating section 210, the transmission/reception section 290 that transmits distribution request information comprising operating information from the operating section 210 and receives game information from the game information distribution device 100, a storage section 230 that temporarily stores received game information, and the display section 220 that uses a browser to shape game information stored in the storage section 230 for display on a liquid-crystal screen. Since this is a telephone, any game sounds are played back from the receiver portion thereof.

Note that game information in this case means the data or program for executing the game, or an object that integrates such data and a program, by way of example. The game information could also comprise game sounds in addition to game images, or it could be game sounds alone. If game sounds are to be output, the portable telephone 200 also comprises a sound output section for outputting game sounds that are based on the game information.

The game information distribution device 100 comprises a transmission/reception section 190 that receives the distribution request information from the portable telephone 200 and transmits the game information; a control section 112 that identifies which portable telephone 200 has transmitted, based on the received distribution request information, and updates predetermined data in a storage section 120; and a game information generation section 111 that generates the game information, based on the received distribution request information.

The image generation section 111 and the control section 112 are integrated as a processing section 110, and the functions thereof could be implemented by means such as a CPU.

The game information generation section 111 comprises an image generation section 113 that generates information for displaying game images and a sound generation section 114 that generates information for playing back game sounds.

More specifically, the image generation section 113 is configured in such a manner that it generates game image pages dynamically, by software that uses the common gateway interface (CGI), by way of example. The sound generation section 114 is implemented by means such as a sound generation IC, by way of example.

The control section 112 comprises a history management section 115, which stores into the storage section 120 a history of exchanges of requests from the portable telephone 200 and corresponding responses from the processing section 110, and an access statistics section 116 that processes statistics on the numbers of accesses from the portable telephone 200.

The storage section 120 could be implemented by means such as RAM and the transmission/reception section 190 could be implemented by means such as a communications device having a packet assembler/disassembler (PAD) function.

Note that it is also possible to have a configuration in which an information storage medium 180 is connected to the game information distribution device 100, whereby the functions thereof can be implemented by reading information (such as a program or object) from that information storage medium 180.

To implement components such as the transmission/reception section 190, the image generation section 111, and the control section 112 in this case, the abovementioned information could comprise a program that implements on a computer: control means that updates history data that indicates the history of at least one of distribution requests and responses corresponding to those distribution requests; information generation means that generates distribution request time specifying information that specifies a distribution request time indicating a time-point or time period at which the terminal device sent a predetermined information distribution request to the information distribution system, based on the history data; and means for transmitting generated distribution request time specifying information to the transmission/reception section 190 for the terminal device.

Note that more specific functions of components such as the game information generation section 111 and the control section 112 could also be implementing by reading information from the information storage medium 180.

In addition, the information stored in the information storage medium 180 could be implemented (embodied) by carrier waves. In other words, it is possible to implement the previously described functions by fetching information from a predetermined host terminal or the like, over a network, without using the information storage medium 180.

Note that a CD-ROM, DVD-ROM, DVD-RAM, IC card, ROM, RAM, or storage medium using a laser or magnetic means, such as a hard disk, could be used as the information storage medium 180.

Data such as individual data 121 containing information for each portable telephone 200 and general data 122 containing access information from a plurality of the portable telephones 200 is stored in the storage section 120.

Note that components such as the previously described game information generation section 111 could be implemented by hardware means using circuitry or the like, or by software means using a program or the like.

The description now turns to the data structure of the individual data 121 and the general data 122.

A schematic view of the individual data 121 in accordance with this example of the present invention is shown in FIG. 5.

The individual data 121 comprises a user table 123, which is provided for each user of the portable telephone 200 and comprises not only the user ID, name, address, age, and occupation of that user, but also that user's game-play history information (the number of times the user has played that game, the degree of advancement within the game, and the game score), and a personal request frequency table 124, which is provided for each user and has items such as the access time period and number of accesses, indicating the distribution request frequency from the portable telephone 200.

For example, the history management section 115 inputs "13524867" as "User ID" in the user table 123, "Haruta" as "Name", "Tokyo" as "Address", "20" as "Age", "Student" as "Occupation", "153" as "Number of plays", "Engaged" as "Degree of progress", and "1430" as "Score".

Time period segments such as "0:00 to 1:00" are provided in an "Access time period" part of the personal request frequency table 124.

Another item called "Number of accesses" is provided in the personal request frequency table 124 to correspond to the "Access time period", and the access statistics section 116 increments the number of accesses in the time period corresponding to a start time-point, whenever that player starts an access to the game information distribution device 100.

The user table 123 comprises a specified time-point and a specified type for distribution request time specifying information that has been specified for the user. In this case, the specified time-point is the date and time, or the time period, when a distribution request is specified. The specified type is the type, such as a time-point specification or time period specification.

Values indicating date and time, such as "10:00", "April 10", or "23:30 on May 2", or values indicating start date/time and end date/time, such as "10:00, 15:00", "April 10, April 20", or "23:30 on May 2, 12:30 on May 5" are input to the "Specified time-point" field.

Similarly, values such as "Approximate time", "Start", "End", or "Period" are input to the "Specified type" field.

Taking the specification of "How about 1 PM tomorrow?" of FIG. 3 as an example, the "Specified time-point" field of the user table 123 becomes "13:00 hours" and the "Specified type" field becomes "Approximate time".

The description now turns to the data structure of the general data 122.

A schematic view of the general data 122 in accordance with this example of the present invention is shown in FIG. 6

The general data 122 comprises a response history table 126 that indicates the history of distribution requests and responses corresponding to those distribution requests, a request frequency table 127 indicating the frequency of distribution requests from a plurality of portable telephones 200 by time period, and a distribution request specification table 128 that indicates the numbers of time-points or time periods specified at distribution request times The response history table 126 contains items such as "Number", "Service details", Request time-point", and "Response time-point". In this case, "Number" is a serial number that is incremented in correspondence with services provided by the game information distribution device 100, where values such as "1" to "211" are input thereto in sequence.

The "Service details" field contains derails of the service provided by the game information distribution device 100; more specifically, these are items corresponding to "Provided game information for a marriage ceremony scene" or "Provided menu image".

The "Request time-point" field indicates the time-point at which the portable telephone 200 requested a service of the game information distribution device 100, in other words, the time-point at which the transmission/reception section 190 received distribution request information from the portable telephone 200. A value indicating a time such as "12:30:00, Sep. 16, 1999" is input to "Request time-point".

The "Response time-point" field indicates the time-point at which the game information distribution device 100 transmitted a response to the request from the portable telephone 200, in other words, the time-point at which the transmission/reception section 190 transmitted to the portable telephone 200 game information corresponding to the distribution request from the portable telephone 200. A value indicating a time such as "12:31:00. Sep. 16, 1999" is input to "Response time-point".

It is therefore possible to obtain the response time taken by that service, by calculating the difference between the response time-point and the request time-point. It is also possible to determine whether or not there is a time period in which processing takes some time, in other words, whether there is a state in which the load on the CPU and other components is too high to enable a prompt response, by comparing the response times for the same service in different time periods.

The request frequency table 127 contains items such as "Access time period" and "Number of accesses" in a similar manner to the personal request frequency table 124, but it differs from the personal request frequency table 124 in that it also indicates the number of times all of the portable telephones 200 have accessed the game information distribution device 100 within individual time periods.

The distribution request specification table 128 contains items such as "Specified time" and "Number of specifications". To simplify the description in this case, the "Specified type" that was mentioned with reference to the user table 123 specifies the distribution request date/time as "Approximate time". The "Specified time" in the "Number of specifications" is assumed to be "0:00" and the numerical values "1" and "4" are stored therein as the numbers of times that distribution request time specifications occurred.

The description now turns to the method by which the game information generation section 111 and other components use the individual data 121 and other data, using the display of the image 402 in FIG. 3 as an example.

First of all, an image prompting the input of data such as "User ID" is generated by the image generation section 113 and information on input values such as "User ID" is transmitted to the game information distribution device 100 by the player inputting data to the input image displayed on the display section 220 of the portable telephone 200. The history management section 115 identifies the player who is using the portable telephone 200 from the information received by the transmission/reception section 190, and inputs values to the user table 123 for that player.

Note that he individual data 121 is generated at the point at which the player enters into a contract to play the game, with someone such as a game trader. The control section 112 updates the user table 123 and the personal request frequency table 124 within the individual data 121, based on the player's game state and the data input by the player.

The player accesses the game information distribution device 100 from the portable telephone 200, but the request frequency table 127 and the personal request frequency table 124 are updated for each access.

If the access time-point, in other words, the distribution request time-point, was 21:10, by way of example, the access statistics section 116 increments the "Number of accesses" for the "Access time period" "21:00 to 22:00" of the request frequency table 127 by 1. Simultaneously therewith, the access statistics section 116 also increments the "Number of accesses" for the "Access time period" "21:00 to 22:00" of the personal request frequency table 124 by 1. This makes it possible to determine the access state in real time, at the game information distribution device 100.

The history management section 115 stores the service details requested by the portable telephone 200 and the request time-point in the response history table 126. The time-point at which the response to that request occurred is also stored in the response history table 126. This makes it possible to obtain the above described response time in substantially real time, enabling determination of the current processing load on the game information distribution device 100 in real time.

If the player pressed the numeric key 1 at the image 400, that information is transmitted as part of the distribution request information to the game information distribution device 100.

The game information generation section 111 determines whether or not it is necessary to specify a distribution request time, such as that of the image 402, from the distribution request information. If it is necessary to specify the distribution request time, the game information generation section 111 refers to the response history table 126, the request frequency table 127, and the distribution request specification table 128, and specifies the most suitable time-point as the distribution request time.

In other words, the game information generation section 111 can determine what times the response time is long, in other words, when the processing load such as the CPU usage ratio is high, by reference to the response history table 126.

The game information generation section 111 can determine the time periods in which accesses cluster, by reference to the request frequency table 127.

The game information generation section 111 can also determine which time-point is most often specified as the distribution request time, by reference to the distribution request specification table 128.

In other words, the game information generation section 111 generates game information that specifies for the distribution request time a time-point at which the response time is short, the number of accesses is small, and which is not often specified as a distribution request time, from these determinations.

By ensuring that each distribution request time is set by a base level in this manner, so that players access at those distribution request time, it becomes possible to reduce the processing wait time of the game information distribution device 100 and thus enable the player to play the game smoothly.

With the example shown in FIG. 3, image information for displaying the image 402 showing the message "Well, see you at 1 PM tomorrow!" on the portable telephone 200 is generated by the image generation section 113.

If the player has selected "(1) OK" by pressing the numeric key 1 from the image 402, the information that "(1) OK" has been selected is transmitted to the game information distribution device 100. This makes it possible to confirm the distribution request time specification.

The information that 1 PM has been specified as the distribution request time is transferred to the control section 112 from the game information generation section 111. With this transfer of information, the history management section 115 inputs "13:00 hours" to the "Specified time-point" field of the user table 123, and "Approximate time" to the "Specified type" field.

The history management section 115 increments the "Number of specifications" for "Specified time" "13:00 hours" of the distribution request specification table 128 by 1.

If the player has ended the game temporarily then started accessing the game information distribution device 100 from the portable telephone 200 at approximately 13:00 hours the next day, the game information generation section 111 determines whether or not the actual distribution request date/time conforms with the specified distribution request date/time. The game information generation section 111 refers to the "Specified time-point" and "Specified type" fields of the user table 123. If the game information generation section 111 determines from this data that the player has started the access at about 13:00 hours, it can determine whether the access conforms to the specification.

If the access does conform to the specification, the game information generation section 111 generates game information that is more advantageous than if it does not conform to the specification. More specifically, the image generation section 113 generates image information for displaying an actual date-proposing image, by way of example, and the sound generation section 114 generates corresponding sound information.

If the portable telephone 200 was not accessed at 13:00 hours the next day, but at about 19:00 hours or about 9:00 hours, the game information generation section 111 generates game information that is disadvantageous for the game. More specifically, the image generation section 113 generates image information for displaying an image showing the character manipulated by the player being cold-shouldered by the other character, by way of example, and the sound generation section 114 generates corresponding sound information.

Since this ensures that the player conforms to the distribution request time as far as possible, by providing advantageous information if the distribution request time is conformed with but disadvantageous information if the distribution request time is not conformed with, it is possible to disperse accesses from the portable telephones 200. This makes it possible to disperse the processing load of the portable telephone 200 so that the player experiences less waiting time and can play an enjoyable game.

As described above, this embodiment of the present invention makes it possible to cope with circumstances such as an increase in players while reinforcing the processing capability of the CPU, by specifying distribution request times in such a manner that the processing of the game information distribution device 100 side is dispersed even if the number of players increases and thus the load on the game information distribution device 100 becomes greater. Since there is little manual work involved with reinforcing the processing capability of the CPU in this manner, it is possible to operate the game information distribution device 100 efficiently at a low cost.

The game information distribution device 100 has been described above with respect to an example in which a distribution request time is specified, but it is, also possible for the player of the portable telephone 200 to determine a distribution request time while performing interactive processing.

Figure 7:
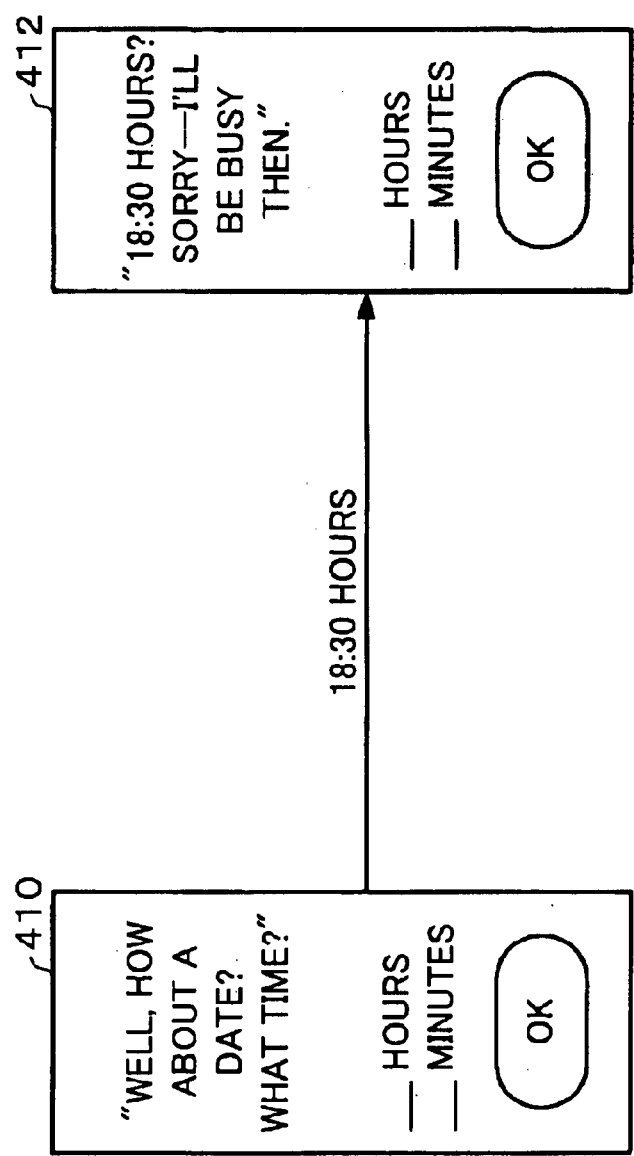
FIG. 7 shows another example of a game image transition in accordance with an example of this embodiment of the present invention.

Another example of an image transition between game images in accordance with an example of this embodiment of the present invention is shown in FIG. 7.

A question image 410 that is displayed on the display section 220 of the portable telephone 200 during a game says: "Well, how about a date? What time? __ hours __ minutes".

The player uses the numeric keys of the portable telephone 200 to input "18" and "30". This transmits distribution request time specifying information indicating that the player has input 18:30 hours, to the game information distribution device 100.

At the game information distribution device 100, the game information generation section 111 references the response history table 126, the request frequency table 127, and the distribution request specification table 128, to determine whether or not 18:30 is suitable as a distribution request time.

If the game information generation section 111 determines that accesses tend to cluster at 18:30, so that it is not a suitable time period, it generates information for displaying a response image indicating allowance or refusal for the distribution request as: "18:30 hours? Sorry—I'll be busy then. __ hours __ minutes"

The portable telephone 200 displays the image 412 and the player inputs another time.

A suitable distribution request time is obtained by repeating this process. In the example shown in FIG. 3, the player can decide upon a time period that suits the player's own circumstances as the distribution request time, by processing that determines the distribution request time interactively, without having to specify a time-point forcibly.

In this manner, it is possible for the player who is using the portable telephone 200 to determine when distribution requests would be appropriate, by receiving hints about the permissivity of distribution request times in accordance with requests from the portable telephone 200. If distribution requests are issued in a time period or at a time-point that is suitable for distribution requests in this manner, it is possible to reduce access waiting time and enable the distribution of congenial game information.

The present invention has been described above with reference to a preferred embodiment thereof, but it should be obvious that the present invention is not limited to that embodiment.

For example, the example described above related to an example of application to the game information distribution device 100 that distributes game information, but it can equally well be applied to other purposes, such as prize applications or concert ticket reservations.

The description now turns to the application of the present invention to a prize application system.

A schematic view of a deadline time-stamp table 129 in accordance with an example of this embodiment of the invention is shown in FIG. 8.

Distribution requests generally cluster immediately after the acceptance-start time-point and immediately before the acceptance-end time-point. More specifically, distribution requests cluster at times such as the start of reservations for concert tickets or the deadline for a prize application period.

For that reason, the processing load on the information distribution device side increases at times such as just before a deadline, leading to a situation in which users have to wait for processing or cannot connect to the information distribution device.

In that case, the deadline time-point table 129 is provided in the storage section of the information distribution device and deadline time-points are allocated for each predetermined terminal number.

In the deadline time-point table 129 shown in FIG. 8. 18:00 hours on September 30 is specified as the "Deadline time-point" for each terminal having a "Terminal number" of 1 to 99, 19:00 hours on September 30 is specified as the "Deadline time-point" for each terminal having a "Terminal number" of 100 to 199, and 20;00 hours on September 30 is specified as the "Deadline time-point" for each terminal having a "Terminal number" of 200 to 299.

Note that these terminal numbers are numbers that have been allocated to the portable telephones 200 beforehand. In other words, the above example illustrates a method in which not only is the user ID input, but also previously allocated terminal numbers are also used. In particular, each portable telephone 200 has been allocated an individual telephone number, so it is possible to identify the portable telephones 200 without duplication.

The description now turns to the images that are used when specifying a time-point.

Figure 9A:
FIG. 9A shows an image that specifies 18:00 hours
Figure 9B:
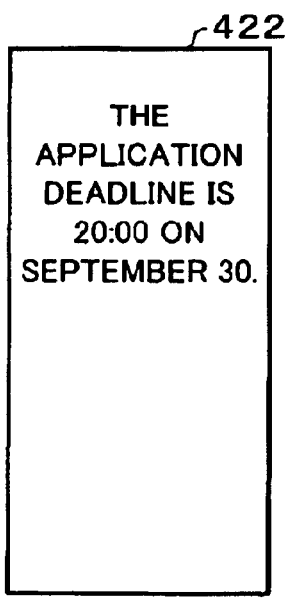
FIG. 9B shows an image that specifies 20:00 hours.

The image shown in FIG. 9A specifies 18:00 hours and that shown in FIG. 9B specifies 20:00 hours.

For example, an image 420 indicating "The application deadline is 18:00 on September 30" is displayed on a portable telephone that the terminal number 50, as shown in FIG. 8. Similarly, an image 422 indicating "The application deadline is 20:00 on September 30" is displayed on a portable telephone that the terminal number 230, as shown in FIG. 8.

Since this makes it possible to stagger the deadline time-points of all the terminals, cluster s that occur just before the deadline can also be dispersed, thus enabling a reduction in the occurrence of situations relating to processing wait and non-connection to the information distribution system.

If the specification times for distribution requests are made to differ for each terminal in this manner, it is necessary to be careful not to be unfair to certain terminals.

If distribution request specification times are to be made different, it is desirable to specify distribution request specification times for different regions, by way of example. Since this ensures that terminal devices within the same region have the same distribution request specification time, each user thinks that other people's deadlines are the same, so there is no feeling of unfairness. This specification by regions can be divided by using the "Address" stored in the user table 123.

It is also desirable to rotate the deadline time-point each time, even if there are different deadline time-points for each region. This makes it possible to prevent a situation in which one region always has an early deadline and other region always has a late deadline>

With the above described embodiment of the present invention, the individual data 121 and the general data 122 is stored in the storage section 120 within the game information distribution device 100, but it is also possible to disperse the data and store it at a plurality of server devices. In addition, it is also possible to implement the various functions of the game information distribution device 100 by dispersing them over a plurality of devices.

The specification of distribution request time to which the present invention is applied need not be applied to all services where the specification of distribution request time is necessary; it can also be applied only to services that involve a heavy processing load. In such a case, components such as the image generation section 113 can determine whether or not this should be applied by referencing the "Service details" which lists requests in the response history table 126.

Similarly, the personal request frequency table 124 and the request frequency table 127 use time periods and numbers of accesses, and determine the distribution request time by a frequency distribution of distribution requests in different time periods, but it is also possible to use other methods, such as one that specifies a time period with a low frequency or a low probability of use, based on a probability distribution.

In addition, it is not essential that a time period or time-point at which accesses cluster should not be specified as the distribution request time; but it could be specified therefor.

Note that although the above embodiments of the present invention were described as relating to examples of the use of the portable telephone 200 as a terminal device, the present invention can equally well be applied to portable telephone sets other than the portable telephone 200, such as a PHS or satellite communications telephone. It is also possible to apply the present invention to devices other than portable telephones, such as PCs, portable information terminals, domestic game machines having communications functions, portable game machines having communications functions, or arcade game machines or pagers having communications functions.

Instead of distributing information that specifies an initial distribution request time for a distribution request from a predetermined terminal device, it is also possible to distribute information that specifies a distribution request time simultaneously to a plurality of terminal devices, as in a broadcast.

The embodiments of the present invention described above related to examples in which the method of specifying a distribution request time in such a manner that distribution request times are staggered is a method of specifying each distribution request time based on history data which is stored in a predetermined storage area and which indicates the history of at least one of distribution requests and responses corresponding to the distribution requests, or a method of specifying each distribution request time based on actual distribution requests.

However, other methods could also be used therefor, such as a method that specifies a distribution request time that is separated by a predetermined time from the previously specified distribution request time, or a method of specifying each distribution request time at random.

The above embodiments of the present invention were described as relating to the generation of image information and sound information for displaying a date-making image in practice, as the advantageous information that is generated for an access that conforms with the distribution request time specification, but method of granting an advantage is not limited to methods of granting a direct advantage in a game, such as moving the game forward advantageously, increasing the game score, or lowering a game-play fee.

For example, it is also possible to use a method of granting an indirect advantages, such as displaying game images that are not usually seen, changing the script spoken by characters in a favorable manner, or enabling the download of a screen saver of a game character.

Note that the above embodiments were described with reference to application to a packet-switching network, but the present invention can equally well be applied to other network formats including a wired communications network such as ISDN or a wide-band communications network such as an ATM network. In practice, the game information distribution device 100 and the portable telephone 200 are not necessarily connected by a packet-switching network; they could equally well be connected over the Internet.

What is claimed is:

1. An information distribution system distributing predetermined information to a terminal device over a transfer path, the information distribution system comprising:
    an information generation section which generates distribution request time for specifying the information that specifies a distribution request time indicating a time-point or a time period at which the terminal device issues a distribution request for the predetermined information;
    a transmission section which transmits the generated distribution request time specifying information to the terminal device;
    a storage section which stores history data, which indicates a history of at least one of a distribution request and a response corresponding to the distribution request and user data which is provided for each user of the terminal device and includes at least one of a name, address, date of birth, age, occupation, telephone number, and game-play history information of the each user;
    a reception section which receives distribution request information from the terminal device; and
    a control section which updates the history data, based on the distribution request information and a response corresponding to the distribution request,
    wherein the control section identifies a user from the distribution request information and updates the user data for the identified user, and
    wherein the information generation section specifies the distribution request time based on the user data and the history data so as to disperse the distribution request time for the terminal device.

2. The information distribution system as defined by claim 1,
    wherein the information generation section generates information for specifying at least one of a start time-point of accepting the distribution request and an end time-point of the distribution request as part of the distribution request time specifying information.

3. The information distribution system as defined by claim 1,
    wherein the storage section stores request frequency data, which indicates a frequency of the distribution requests from a plurality of terminal devices for each of predetermined time periods, and
    wherein the information generation section specifies as the distribution request time a time period in which the distribution request frequency is low, or a time-point included in the time period, based on the request frequency data.

4. The information distribution system as defined by claim 1,
    wherein the user data comprises address information indicating the address of the each user, and
    wherein the information generation section generates distribution request time for specifying information which specifies distribution request times that differ for different regions, based on the address information.

5. The information distribution system as defined by claim 1,
    wherein the user data includes the distribution request time for specifying information that was specified with respect to the each user, and
    wherein the control section updates the user data, based on distribution request time for specifying information specified by the information generation section.

6. The information distribution system as defined by claim 1,
    wherein the storage section stores distribution request specifying data for indicating number of time-point or time period specified as the distribution request time, and
    wherein the control section updates the distribution request specifying data, based on the distribution request time specifying information specified by the information generation section.

7. The information distribution system as defined by claim 1,
    wherein information that is distributed to the terminal device is game information, and wherein the information generation section generates game information for playing at least one of a game image and a game sound on the terminal device.

8. The information distribution system as defined by claim 7,
wherein the control section updates the user data, based on a time-point of the distribution request, and
wherein the information generation section generates at least one of game information which makes a game progress more advantageously when the terminal device has issued a distribution request at a time-point conforming with the distribution request time than when a distribution request has been issued at a time-point not conforming with the distribution request time, and game information which makes a game progress less advantageously when the terminal device has issued a distribution request at a time-point not conforming with the distribution request time than when a distribution request has been issued at a time-point conforming with the distribution request time, based on the user data.

9. An information distribution system distributing predetermined information to a terminal device over a transfer path, the information distribution system comprising:
an information generation section which generates distribution request time for specifying the information that specifies a distribution request time for indicating a time-point or a time period at which the terminal device issues a distribution request for the predetermined information;
a transmission section which transmits the generated distribution request time specifying information to the terminal device; and
a storage section which stores history data, which indicates a history of at least one of a distribution request and a response corresponding to the distribution request and personal request frequency data, which indicates frequency of a distribution request from the terminal device and which is provided for each user of the terminal device,
wherein the information generation section specifies as the distribution request time a time period in which the distribution request frequency is low, or a time-point included in the time period, based on the personal request frequency data and the history data so as to disperse the distribution request time for the terminal device.

10. The information distribution system as defined by claim 9,
wherein the control section updates the personal request frequency data, based on a time-point of the distribution request, and
wherein the information generation section generates at least one of game information which makes a game progress more advantageously when the terminal device has issued distribution requests dispersedly over a plurality of time periods than when distribution requests have been issued concentratedly, and game information which makes a game progress less advantageously when the terminal device has issued distribution requests concentratedly within a predetermined time period than when distribution requests have been issued dispersedly, based on the personal request frequency data.

11. An information distribution system distributing predetermined information to a terminal device over a transfer path, the information distribution system comprising:

a reception section which receives from the terminal device distribution request time specifying information including a specification of a distribution request time for indicating a time-point or time period at which the terminal device issues a distribution request for the predetermined information;
an information generation section which generates distribution request time for allowing or refusing information that is stored in a predetermined storage section and indicates allowance or refusal to a specification of a distribution request time, based on history data, which indicates a history of at least one of a distribution request and a response corresponding to the distribution request, and on the distribution request time specifying information; and
a transmission section which transmits the generated distribution request time allowing/refusing information to the terminal device.

12. A program embodied on an information storage medium or in a carrier wave which is a program for distributing predetermined information to a terminal device over a transfer path, the program comprising means for implementing in a computer:
an information generation section which generates distribution request time for specifying information that specifies a distribution request time indicating a time-point or a time period at which the terminal device issues a distribution request for the predetermined information;
a transmission section which transmits the generated distribution request time specifying information to the terminal device;
a reception section which receives the distribution request information from the terminal device;
a control section which updates the history data, based on the distribution request information and a response corresponding to the distribution request; and
a storage section which stores history data, which indicates a history of at least one of a distribution request and a response corresponding to the distribution request and user data which is provided for each user of the terminal device and includes at least one of a name, address, date of birth, age, occupation, and telephone number of the each user,
wherein the control section identifies a user from the distribution request information and updates the user data for the identified user, and
wherein the information generation section specifies the distribution request time based on the user data and the history data so as to disperse the distribution request time for the terminal device.

13. The program as defined by claim 12,
wherein the information generation section generates information for specifying at least one of a start time-point of accepting the distribution request and an end time-point of the distribution request as part of the distribution request time specifying information.

14. The program as defined by claim 12,
wherein the storage section stores request frequency data, which indicates a frequency of the distribution requests from a plurality of terminal devices for each of predetermined time periods, and
wherein the information generation section specifies as the distribution request time a time period in which the distribution request frequency is low, or a time-point included in the time period, based on the request frequency data.

15. The program as defined by claim 12, wherein the user data comprises address information indicating the address of the each user, and wherein the information generation section generates the distribution request time for specifying information which specifies distribution request times that differ for different regions, based on the address information.

16. The program as defined by claim 12 wherein the user data comprises the distribution request time for specifying information that was specified with respect to the each user, and wherein the control section updates the user data, based on distribution request time for specifying information specified by the information generation section.

17. The program as defined by claim 12, wherein the storage section stores distribution request specifying data for indicating number of time-point or time period specified as the distribution request time, and wherein the control section updates the distribution request specifying data, based on the distribution request time specifying information specified by the information generation section.

18. The program as defined by claim 12, wherein information that is distributed to the terminal device is game information, and wherein the information generation section generates the game information for playing at least one of a game image and a game sound on the terminal device.

19. The program as defined by claim 18, wherein the control section updates the user data, based on a time-point of the distribution request, and wherein the information generation section generates at least one of game information which makes a game progress more advantageously when the terminal device has issued a distribution request at a time-point conforming with the distribution request time than when a distribution request has been issued at a time-point not conforming with the distribution request time, and game information which makes a game progress less advantageously when the terminal device has issued a distribution request at a time-point not conforming with the distribution request time than when a distribution request has been issued at a time-point conforming with the distribution request time, based on the user data.

20. A program embodied on an information storage medium or in a carrier wave which is a program for distributing predetermined information to a terminal device over a transfer path, the program comprising means for implementing in a computer:

an information generation section which generates distribution request time for specifying information that specifies a distribution request time indicating a time-point or a time period at which the terminal device issues a distribution request for the predetermined information;

a transmission section which transmits the generated distribution request time specifying information to the terminal device; and a storage section which stores history data, which indicates a history of at least one of a distribution request and a response corresponding to the distribution request and personal request frequency data, which indicates frequency of the distribution request from the terminal device and which is provided for each user of the terminal device, wherein the information generation section specifies as the distribution request time a time period in which the distribution request frequency is low, or a time-point included in the time period, based on the personal request frequency data and the history data so as to disperse the distribution request time for the terminal device.

21. The program as defined by claim 20, wherein the control section updates the personal request frequency data, based on a time-point of the distribution request, and wherein the information generation section generates at least one of game information which makes a game progress more advantageously when the terminal device has issued distribution requests dispersedly over a plurality of time periods than when distribution requests have been issued concentratedly, and game information which makes a game progress less advantageously when the terminal device has issued distribution requests concentratedly within a predetermined time period than when distribution requests have been issued dispersedly, based on the personal request frequency data.

22. A program embodied on an information storage medium or in a carrier wave which is a program for distributing predetermined information to a terminal device over a transfer path, the program comprising means for implementing in a computer:

a reception section which receives from the terminal device distribution request time specifying information comprising a specification of a distribution request time indicating a time-point or time period at which the terminal device issues a distribution request for the predetermined information;

an information generation section which generates the distribution request time for allowing or refusing information that is stored in a predetermined storage section and indicates allowance or refusal to a specification of a distribution request time, based on history data, which indicates a history of at least one of a distribution request and a response corresponding to the distribution request, and on the distribution request time specifying information; and a transmission section which transmits the generated distribution request time for allowing or refusing information to the terminal device.

* * * * *